United States Patent [19]
Yamada et al.

[11] Patent Number: 6,088,780
[45] Date of Patent: *Jul. 11, 2000

[54] PAGE TABLE WALKER THAT USES AT LEAST ONE OF A DEFAULT PAGE SIZE AND A PAGE SIZE SELECTED FOR A VIRTUAL ADDRESS SPACE TO POSITION A SLIDING FIELD IN A VIRTUAL ADDRESS

[75] Inventors: Koichi Yamada, Santa Clara; Gary N. Hammond, Campbell; Jim Hays, San Jose; Jonathan Kent Ross, Sunnyvale; Stephen Burger, Santa Clara; William R. Bryg, Saratoga, all of Calif.

[73] Assignee: Institute for the Development of Emerging Architecture, L.L.C., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,337

[22] Filed: Mar. 31, 1997

[51] Int. Cl.[7] .................................................. G06F 12/10

[52] U.S. Cl. .......................................... 711/206; 711/204

[58] Field of Search .................................. 711/204, 206, 711/209, 216

[56] References Cited

U.S. PATENT DOCUMENTS

| | | | |
|---|---|---|---|
| 4,356,549 | 10/1982 | Chueh ...................................... | 364/200 |
| 4,980,816 | 12/1990 | Fukuzawa et al. ..................... | 364/200 |
| 5,058,003 | 10/1991 | White et al. ............................. | 395/400 |
| 5,375,214 | 12/1994 | Mirza et al. ............................. | 395/400 |
| 5,412,787 | 5/1995 | Forsyth et al. .......................... | 395/400 |
| 5,446,854 | 8/1995 | Khalidi et al. .......................... | 395/401 |
| 5,475,827 | 12/1995 | Lee et al. ................................. | 395/417 |
| 5,479,627 | 12/1995 | Khalidi et al. .......................... | 395/415 |
| 5,526,504 | 6/1996 | Hsu et al. ................................ | 395/417 |
| 5,555,387 | 9/1996 | Branstad et al. ........................ | 395/419 |
| 5,617,554 | 4/1997 | Alpert et al. ............................ | 395/418 |
| 5,752,275 | 5/1998 | Hammond ............................... | 711/207 |

OTHER PUBLICATIONS

PCT International Search Report (PCT/US98/02047), 9 pages, dated Aug. 14, 1998, authorized officer: Kevin Verbrugge.

i750, i860 & i960, Processors and Related Products, Intel Corporation (1993) 7 Pages.

Shanley, et al., "ISA System Architecture, New Revised Edition", vol. 1, pp. 137–156 (1991 & 1993).

Kane, et al., "MIPS RISC Architecture", Prentice Hall, Englewood Cliffs, New Jersey, Ch 6, 57 Pages, Ch 4, 30 Pages (1992).

POWERPC 601, RISC Microprocessor User's Manual, Memory Management Unit, Ch 6, Motorola, 63 pages, (1993).

*Primary Examiner*—Eddie P. Chan
*Assistant Examiner*—Kevin Verbrugge
*Attorney, Agent, or Firm*—Blakely, Sokoloff, Taylor & Zafman, LLP

[57] ABSTRACT

A method and apparatus for implementing a page table walker that uses at least one of a default page size and a page size selected for a virtual address space to position a sliding field in a virtual address. According to one aspect of the invention, an apparatus for use in a computer system is provided that includes a page size storage area and a page table walker. The page size storage area is used to store a number of page sizes each selected for translating a different set of virtual addresses. The page table walker includes a selection unit coupled to the page size storage area, as well as a page entry address generator coupled to the selection unit. For each of the virtual address received, the selection unit positions a field in that virtual address based on the page size selected for translating the set of virtual addresses to which that virtual address belongs. In response to receiving the bits in the field identified for each of the virtual addresses, the page entry address generator identifies an entry in a page table based on those bits.

35 Claims, 5 Drawing Sheets

| PAGE SIZE | OFFSET FIELD | PAGE ENTRY FIELD |
|---|---|---|
| 4K | 0:11 | 12:12+P |
| 8K | 0:12 | 13:13+P |
| 16K | 0:13 | 14:14+P |
| ⋮ | ⋮ | ⋮ | ing into its corresponding physical
PAGE TABLE WALKER THAT USES AT LEAST ONE OF A DEFAULT PAGE SIZE AND A PAGE SIZE SELECTED FOR A VIRTUAL ADDRESS SPACE TO POSITION A SLIDING FIELD IN A VIRTUAL ADDRESS

REFERENCE TO RELATED TO APPLICATIONS

This application is related to copending application Ser. No. 08/829,782 titled "A Method and Apparatus for Implementing a Page Table Walker That Uses a Sliding Field in the Virtual Addresses to Identify Entries in a Page Table", having the same specification as the instant application, assigned to Intel Corporation, and filed also on Mar. 31, 1997.

BACKGROUND OF THE INVENTION

1. Field of the Invention

The invention relates to the field of computer systems. More specifically, the invention relates to the area of memory management.

2. Background Information

Memory addressing schemes often use a technique called paging to implement virtual memory. When using paging, the virtual address space (i.e., the address space generated by either the execution unit of a processor or by the execution unit in conjunction with a segmentation unit of a processor) is divided into fix sized blocks called pages, each of which can be mapped onto any of the physical addresses (i.e., the addresses that correspond to hardware memory locations) available on the system. In a typical computer system, a memory management unit determines and maintains, according to paging algorithm(s), the current mappings for the virtual to physical addresses using one or more page tables.

Upon receiving a virtual address from the execution unit of a processor, typical memory management units initially translate the virtual address into its corresponding physical address using the page table(s). Since the page table(s) are often stored in main memory, accessing the page tables is time consuming. To speed up the paging translations, certain computer systems store the most recently used translations in a translation look-aside buffer or TLB (a faster memory that is often located on the processor). Upon generating a virtual address requiring translation, the memory management unit first searches for the translation in the TLB before accessing the page table(s). If the translation is stored in the TLB, a TLB "hit" is said to have occurred and the TLB provides the translation. However, if the translation is not stored in the TLB, a TLB "miss" is said to have occurred and a page table walker is invoked to access the page tables and provide the translation.

A number of different techniques are used for implementing page table walkers, including: 1) hardware on the processor to access the page table(s) (referred to as a "hardware page table walker"); 2) operating system routine(s) whose execution controls the accessing of the page table(s) (referred to as a "software page table walker"); etc. In addition, a number of different techniques are used for implementing the page tables, including: 1) forward mapping page tables; 2) hash page tables; etc. Certain systems use multiple techniques for handling TLB misses. For example, one system uses a hardware page table walker to access a hash page table and a software page table walker to control the walking of forward mapping page table(s). Thus, the phrase "page table walker" is used herein to refer to any technique for providing a translation when another address translation unit cannot provide the translation.

In certain computer system, it is advantageous to simultaneously support different page sizes. A page table walker that simultaneously supports different page sizes can be implemented using any number of different schemes, including: 1) multiple page table schemes (referred to herein as "forward mapping schemes"); and 2) single page table schemes.

FIG. 1 is a block diagram illustrating an exemplary forward mapping scheme that simultaneously supports two page sizes. As shown in FIG. 1, the virtual addresses for the small pages are divided into an offset field and two index fields, while the virtual addresses for large pages are divided into a larger offset field and one index field. The contents of the first index field in each virtual address is an index into the level one page table. One or more bits are stored in each entry of the level one page table to indicate if that entry is associated with a large or small page. If the entry is associated with a small page, the entry stores the base address of a level 2 page table that must be accessed. In contrast, if the entry is associated with a large page, the entry stores the base address of the large page.

A limitation of forward mapping schemes is that they require a separate level of pages tables for each page size supported. In addition, the smaller page sizes require multiple page table entries, and therefore, multiple page table accesses. Unfortunately, the smaller page sizes are typically used more often than the larger.

In contrast, single page table schemes build a single page table that is created for the smallest supported page size. Singe page table schemes include hashed page table schemes, inverted page table schemes, etc. Each entry in the page table stores the base address of a page. Since the page table is created for the smallest supported page size, multiple page table entries must be used to identify pages of a larger page size. For example, FIG. 2 is a block diagram illustrating an exemplary single page table scheme that simultaneously supports two page sizes. As shown in FIG. 2, the virtual addresses associated with both large and small page sizes are divided into a virtual page number field and an offset field. The contents of the virtual page number field are used to identify a page, while the contents of the offset field are used to identify the different address locations in that page. For a given page, the contents of the virtual page number field for all virtual addresses mapped to that page are the same, while the contents of the offset field vary.

The contents of a page entry field in each virtual address are used to identify an entry in the page table. The contents of the page entry field can be used to directly identify an entry in the page table (e.g., concatenating the contents of the page entry field with the base address of the page table) or to indirectly identify an entry in the page table (e.g., concatenating the base address of the page table with the results of performing a hash function on the contents of the page entry field).

For a given small page, the page entry field is the same as the virtual page number, and therefore all virtual addresses being mapped to a given small page will be mapped to the same entry in the page table. As a result, only one entry in the page table is required for each small page.

Since the page table shown in FIG. 2 is created for small pages, the page entry field used for large pages must be the same size as the page entry field used for the small pages. While the page entry field for both the small and large pages is the same size, the offset field for large pages is larger than the offset field for small pages. As a result, the page entry and offset fields for large pages overlap. Since the page entry and offset fields for large pages overlap, the page entry field for all virtual addresses mapped to the same large page will not be the same (i.e., the contents of the offset field vary for different virtual address mapped to the same large page) and multiple entries in the page table are required. The greater the overlap of the offset and page entry fields, the more entries required in the page table (i.e., an overlap of 1 bit requires 2 entries, an overlap of 2 bits requires 4 entries, etc.). As shown in FIG. 2, a large page size is created by storing the same base address in the multiple page table entries associated with that page.

A limitation of both single and multiple page table schemes is that there is no savings in the number of page table entries required for mapping large pages as opposed to small pages.

SUMMARY

A method and apparatus is disclosed for implementing a page table walker that uses at least one of a default page size and a page size selected for a virtual address space to position a sliding field in a virtual address. According to one aspect of the invention, an apparatus for use in a computer system is provided that includes a page size storage area and a page table walker. The page size storage area is used to store a number of page sizes each selected for translating a different set virtual addresses. The page table walker includes a selection unit coupled to the page size storage area, as well as a page entry address generator coupled to the selection unit For each of the virtual address received, the selection unit positions a field in that virtual address based on the page size selected for translating the set of virtual addresses to which that virtual address belongs. In response to receiving the bits in the field identified for each of the virtual addresses, the page entry address generator identifies an entry in a page table based on those bits.

According to another aspect of the invention, a computer system is provided that includes an operating system and a page table stored in a machine readable medium, as well as a processor coupled to the machine readable medium and containing a page table walker. The execution of the operating system by the processor causes the computer system to distinguish between at least two separate virtual address spaces. The page table walker includes a selection unit, as well as a page entry address generator coupled to the selection unit. For each of the virtual addresses received, the selection unit positions a field in that virtual address in either a first or second position based respectively on which of the first and second virtual address spaces that virtual address belongs. In response to receiving the bits in the field identified for each of the virtual addresses, the page entry address generator identifies an entry in a page table based on those bits.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention.

Overview

A method and apparatus for implementing a page table walker that uses a sliding field in the virtual addresses to identify entries in the page tables is disclosed. In response to a request to translate a virtual address, one of a number of page sizes is selected for translating that virtual address. Based on the selected page size, a field of the virtual address is selected (referred to herein as the "page entry field"). The contents of the selected page entry field are used directly or indirectly to identify an index into a page table.

The closer that the selected page size is to the actual page size, the fewer entries in the page table that are required for mapping that page. In fact, if the correct page size is selected for translating the virtual addresses currently being mapped to a particular page, then only a single entry in the page table is required for mapping that page, regardless of whether the page is large or small. By reducing the number of entries in the page table required for larger pages, a saving in memory space is realized over prior single and multiple page table schemes.

One Embodiment of the Invention

Figure 1:
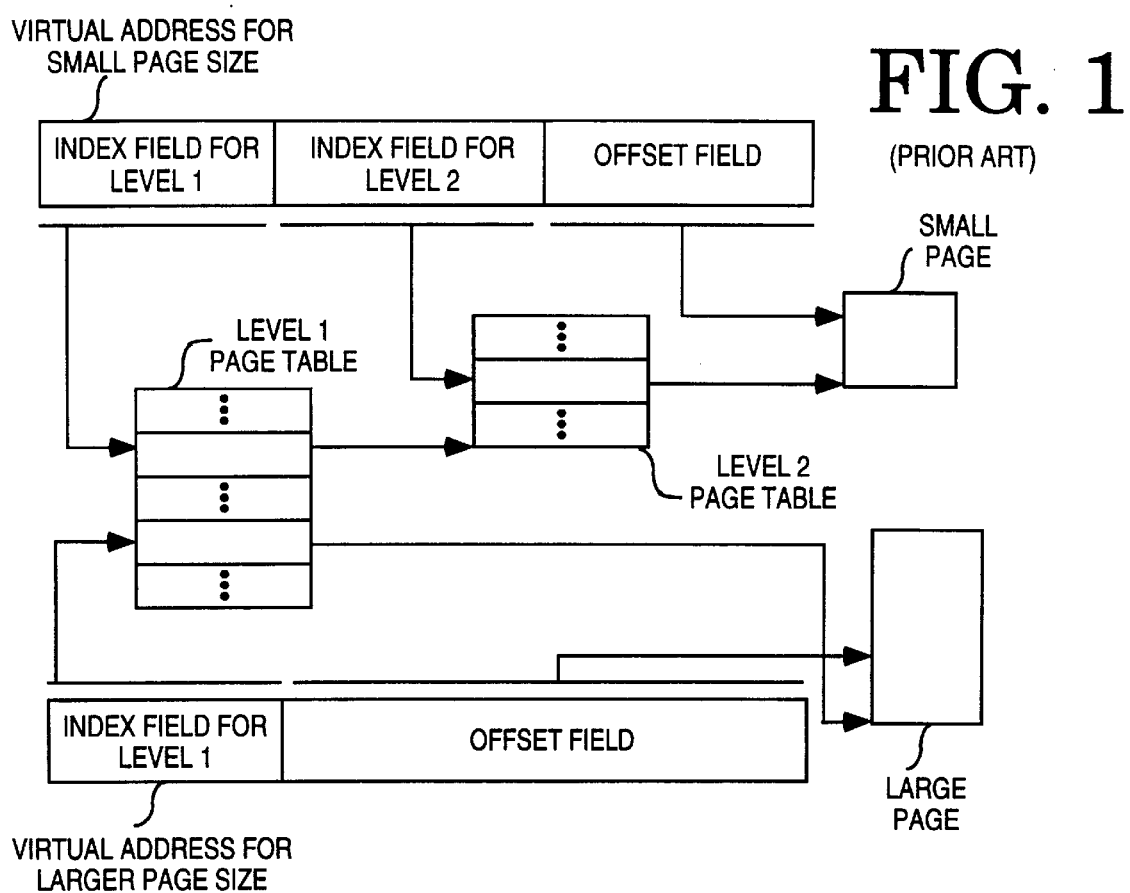
FIG. 1 is a block diagram illustrating an exemplary forward mapping scheme that simultaneously supports two page sizes.
Figure 2:
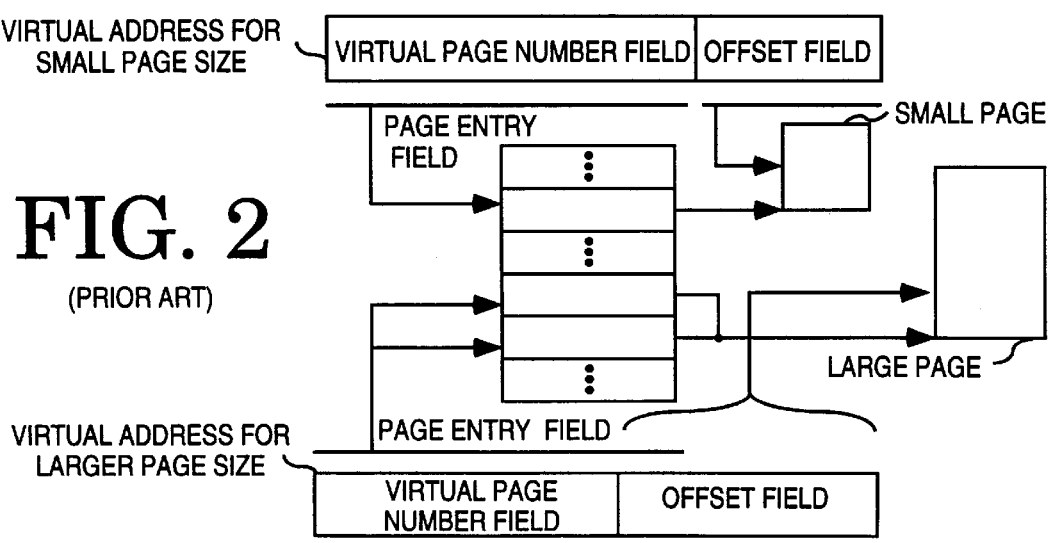
FIG. 2 is a block diagram illustrating an exemplary single page table scheme that simultaneously supports two page sizes.
Figures 3A, 3B:
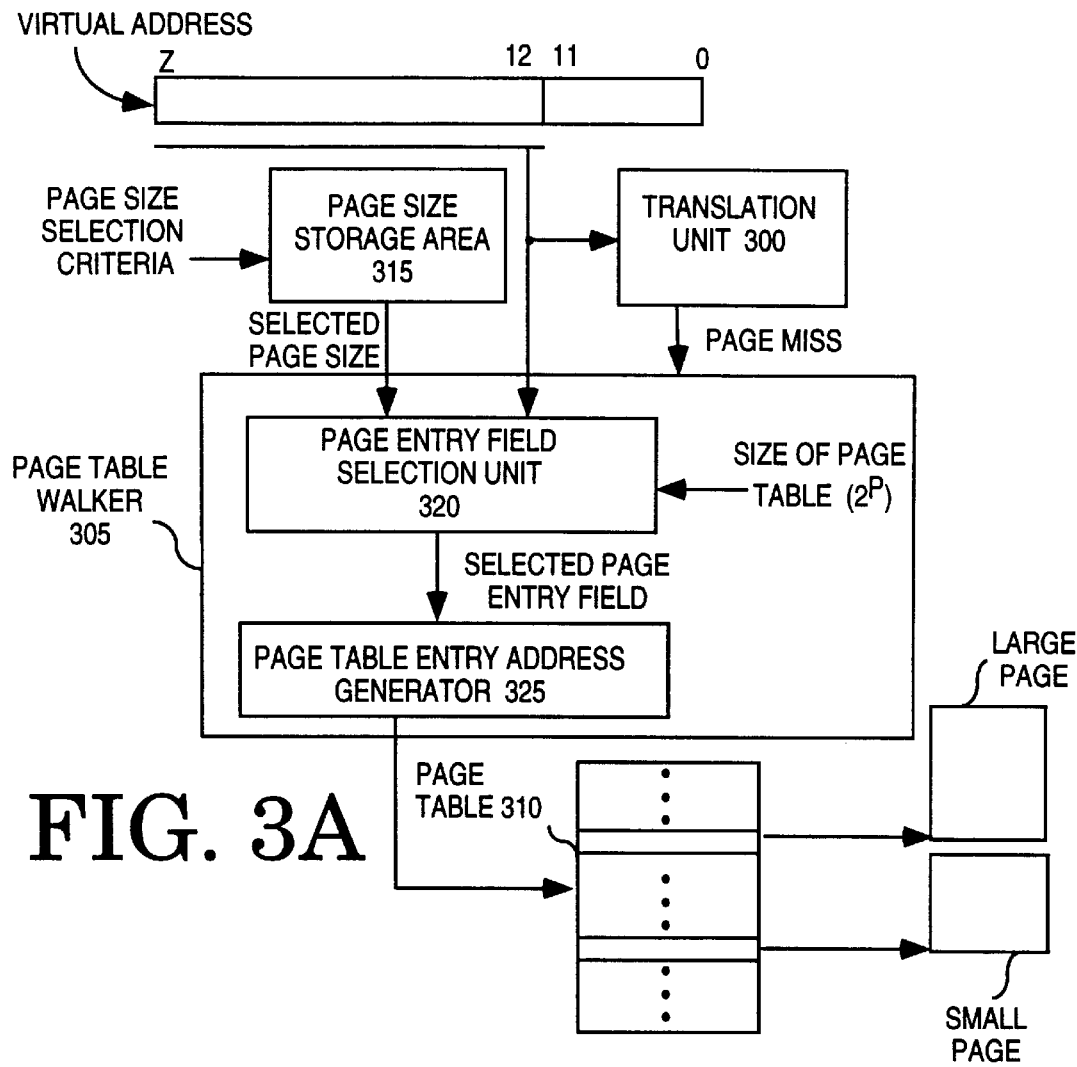
FIG. 3A is a block diagram illustrating an apparatus for translating virtual addresses into physical addresses according to one embodiment of the invention.
FIG. 3B is a chart illustrating the different page entry fields selected by the page entry field selection unit 320 according to one embodiment of the invention.

FIG. 3A is a block diagram illustrating an apparatus for translating virtual addresses into physical addresses according to one embodiment of the invention. FIG. 3A shows a translation unit 300, a page table walker 305, a page table 310, and a page size storage area 315. The term "storage area" is used herein to refer to any mechanism for storing data, including locations in a machine readable media (e.g., read only memory (ROM), random access memory (RAM), magnetic disk storage media, optical storage media, flash memory devices, etc.), one or more registers in a processor, etc.

The page size storage area 315 stores a number of page sizes supported by a computer system. For each virtual address to be translated, a set of page size selection criteria are received by the page size storage area 315 to select the page size to be used by the page table walker 305. The page size selection criteria used for a given virtual address can be generated using any number of techniques, including selecting between the different page sizes stored in the page size storage area 315 based on: 1) bits in the virtual address; 2) the instruction associated with the virtual address (e.g., the execution of I/O instructions may result in the selection of large page sizes, while the execution of non-I/O instructions may result in the selection of smaller page sizes); etc. An exemplary embodiment of the invention that selects the different page sizes to be used for translating virtual addresses based on bits in the virtual addresses is later described herein with reference to FIG. 5.

Any number of different techniques can be used for implementing the page size storage area 315, including 1) hardwiring the different page sizes; 2) providing a dynamic storage area and allowing the operating system to write different page sizes into that storage area; 3) hardwiring certain pages sizes and providing a dynamic storage area for others; etc.

The translation unit 300 is used for translating virtual addresses into physical addresses (e.g., a translation lookaside buffer, a page table walker, etc.). At times, the translation unit 300 will lack the data necessary to translate different virtual addresses. When the translation unit 300 lacks the data for translating a virtual address, a page miss signal is transmitted to the page table walker 305.

The page table walker 305 includes a page entry field selection unit 320 and a page table entry address generator 325. In response to a page miss signal from the translation unit 300, the page entry field selection unit 320 receives: 1) at least part of the virtual address that caused the page miss; and 2) the selected page size for translating the virtual address from the page size storage area 315. In addition, the page entry field selection unit 320 receives an indication of the size ($2^P$) of the page table 310. Any number of techniques could be used for providing an indication of the page table's size, including hardwired circuitry, a register storing a dynamic indication, etc.

The page entry field selection unit 320 identifies a page entry field in the virtual address based on: 1) the page size received from the page size storage area 315; and 2) the size of the page table 310. In particular, the page entry field is selected such that the page entry field does not overlap the offset field for the selected page size received from the page size storage area 315. The contents of the selected page entry field are used directly or indirectly by the page table walker 305 to identify an entry in the page table 310.

FIG. 3B is a chart illustrating the different page entry fields selected by the page entry field selection unit 320 according to one embodiment of the invention. As shown in FIG. 3B, since the offset field for a 4K page size is bits 11:0, the page entry field selected for the 4K page size includes bits 12:12+P. Similarly, since the offset field for the 8K page size includes bits 12:0, the page entry field for the 8K page size is slide up one bit and includes bits 13:13+P. Likewise, since the offset field for the 16K page size includes bits 13:0, the page entry field for the 16K page size is slide up two bits and includes bits 14:14+P. Thus, the larger the page size identified by the page size storage area 315, the further the page entry field selection unit 320 slides the position of the page entry field. In this manner, the page entry field selection unit 320 positions a field in the virtual addresses based on the selected page size.

As previously described, the contents of the virtual page number field of a virtual address are used to identify a page, while the contents of the offset field are used to identify the different address locations in that page. All virtual addresses mapped to the same page contain the same data in the virtual page number field, but different data in the offset field. If the correct page size is selected for the virtual addresses being mapped to a particular page, then the page entry and offset fields do not overlap and the contents of the page entry field are the same for all virtual addresses mapped to that page. Since the contents of the page entry field are the same for all virtual addresses mapped to that page, only one entry in the page table is required, regardless of the size of that page.

In one embodiment, the page size storage area 315 must provide the correct page size for each virtual address and only one entry in the page table is required for each page. However, a reduction in the number of page table entries is also realized in alternative embodiments of the invention in which the page size storage area 315 provides a "default" page size that is either the correct page size or smaller. For example, assume that a computer system supporting 4K, 8K and 16K page sizes needs to translate a virtual address currently being mapped to a 16K page. As previously stated, if the page size provided by the page size storage area 315 is the 16K page size, then a single entry in the page table is required (the offset and page entry fields do not overlap). However, if the page size provided by the page size storage area 315 is the 8K page size, then a single bit of the virtual address resides in both the offset field and the page entry field. Since the offset and page entry fields overlap by one bit, two entries in the page table 310 are required. In contrast, if the page size storage area 315 provides the 4K page size, then the offset and page entry fields overlap by two bits and four entries in the page table 310 are required. As shown by the described example, the closer the selected page size (i.e., the page size provided by the page size storage area 315) is to the actual page size, the lower the number of page table entries required for mapping that page.

In embodiments that support default page sizes, the system must be able to identify which page table entries are being used for page sizes larger than the default page size so that the correct offset field in the virtual address can be selected. For example, embodiments of the invention that support default page sizes can store data in each page table entry that directly or indirectly identifies the size of the offset field to be used. In one such embodiment, each entry of the page table contains data indicating the correct size of the page that entry identifies. If the default page size is not the size of the page for which the translation is being generated, then the correct page size stored in the identified entry of the page table is used in determining the size of the offset field.

Regardless of whether default page sizes are supported, the page table can store more translations or be smaller because less entries in the page table are required for mapping large pages. Furthermore, it is impractical to support multiple page sizes having a large disparity in size using the fixed page entry field page table schemes described in the background because of the number of entries required for larger pages. However, the invention allows multiple pages of any size to be effectively mapped using a single page table scheme.

While one embodiment is described in which the smallest supported page is 4K, alternative embodiments could use any number of different page sizes as the smallest page size. In addition, while one embodiment is described in which at least a 4K, 8K, and 16K page size are supported, alternative embodiments could support any number of page sizes and/or different page sizes.

Referring again to FIG. 3A, the page table entry address generator 325 is coupled to the page entry field selection unit 320 to receive the bits from the virtual address that reside in the selected page entry field. The page table entry address generator 325 generates the address of an entry in the page table 310 using the bits in the selected page entry field. The page table entry address generator 325 can use the bits in the selected page entry field in any number of ways. For example, in one embodiment the bits in the selected page entry field are concatenated with the base address of the page table. In another embodiment, the base address of the page table is concatenated with the result of performing a hash function on the bits in the selected page entry field. FIG. 3A also shows a smaller page size and a larger page size that are respectively identified by a single entry in the page table 310.

In summary, the apparatus shown in FIG. 3A selects a page size for the virtual address currently being translated. The selected page size is then used to select a page entry field that does not overlap the offset field for the selected page size. The page table is then walked by the page table walker based on the contents of the selected page entry field. If the correct page size is selected, only a single entry in the page table is required. While in one embodiment of the invention the selected page size must be correct, in alternative embodiments of the invention the selected page size is a default page size that need not be correct. In embodiments of the invention in which the selected page size need not be correct, the closer the selected page size is to the actual page size of the virtual address, the less the page entry and offset fields overlap. The less the page entry and offset fields overlap, the less entries required for that page in the page table.

It is understood that depending on the size of the page table and/or the use of a hash function by the page table walker, there may be collisions. That is, virtual addresses currently mapped to different pages may be mapped to the same entry in the page table. As described later herein with reference to FIG. 6, any number of different techniques can be used for handling collisions.

In the embodiment shown in FIG. 3A, the page entry field selection unit 320 receives all of the bits of the virtual address except the bits of the offset field for the smallest page size supported by the embodiment. Since the smallest page size supported by the embodiment is a 4K page size that requires bits 11:0 of the virtual address as the offset field, the page entry field selection unit 320 receives all the bits of the virtual address except bits 11:0. However, alternative embodiments may provide any number of different bits from the virtual address to the page entry field selection unit 320, including: 1) all of the bits of the virtual address; 2) not all of the most significant bits; etc.

Each of the translation unit 300, the page entry field selection unit 320, the page table entry address generator 325, and the page size storage area 315 may be implemented in hardware and/or software. In typical computer systems, the page table 310 is stored in main memory. In one embodiment of the invention, the translation unit 300, the page entry field selection unit 320, the page table entry address generator 325, and the page size storage area 315 are implemented in hardware on a processor, while the execution of the operating system on that processor creates and maintains the page table 310 in main memory.

While one embodiment is shown in which the page table walker 305 is invoked in response to a page miss by another translation unit, alternative embodiment could utilize the page table walker 305 as the primary translation unit. In addition, alternative embodiments may include additional page table walkers. If additional page table walkers are provided, any number of techniques may be used for selecting amongst the page table walkers, including a hierarchy in which a page miss in one page table walker causes the next page table walker in the hierarchy to be invoked. Thus, the invention is not limited by the number of page table walkers, nor the techniques used by the additional page table walkers.
A Computer System According to One Embodiment of the Invention A computer system according to one embodiment of the invention supports separate virtual address spaces (sometimes referred to as "regions of virtual address space" or "virtual regions") using virtual address extensions, where each separate virtual address space can contain one or more pages. Each of the separate virtual address spaces may be utilized for any number of different uses. Furthermore, each of the variety of different uses for the different virtual address spaces may have different memory accessing characteristics (e.g., local, global, etc.).

Figure 4:
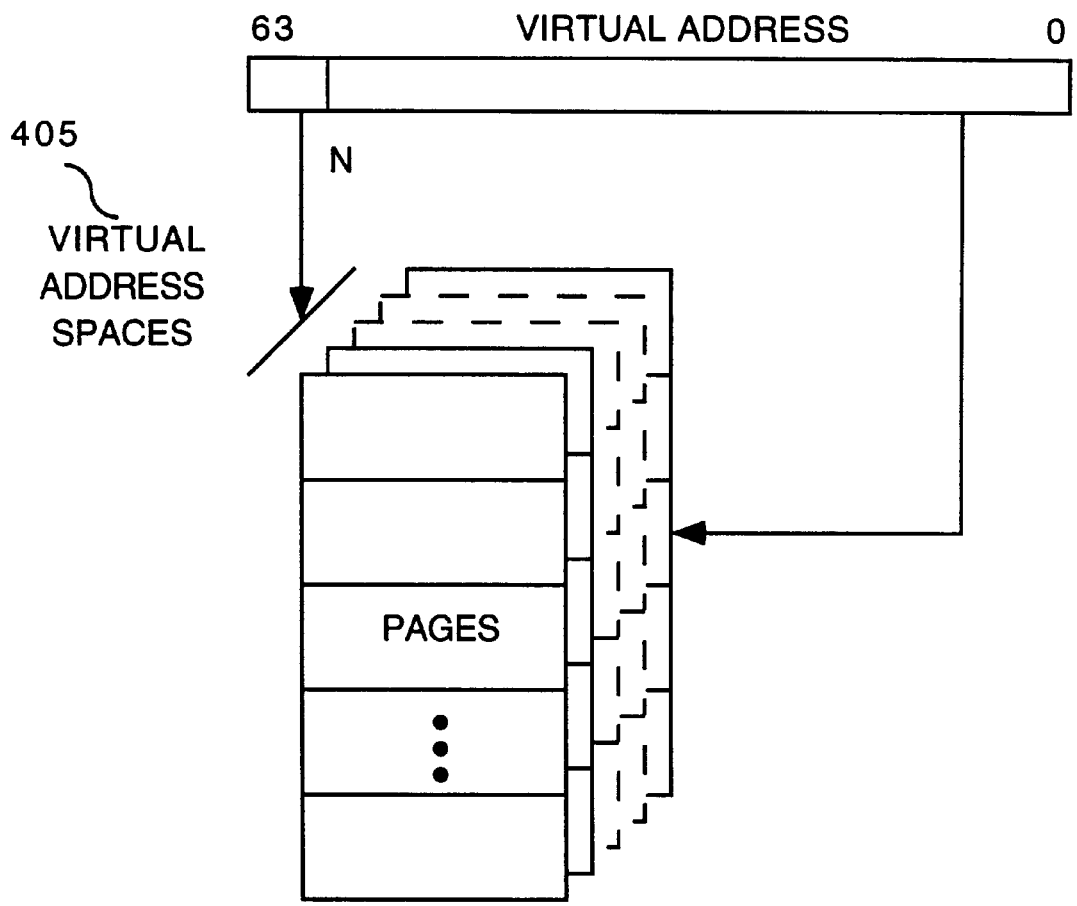
FIG. 4 is a block diagram illustrating the manner in which different virtual address spaces are created according to one embodiment of the invention.

FIG. 4 is a block diagram illustrating the manner in which different virtual address spaces are created according to one embodiment of the invention. FIG. 4 shows that each virtual address has 64 bits numbered 0 to 63. In one embodiment of the present invention, N upper bits of each virtual address are used as a "virtual address extension identifier" (also referred to as a "region identifier") to select one of up to $2^N$ virtual address extensions. Each virtual address extension can identify a different virtual address space. In one embodiment, each of the different virtual address spaces 405 has $2^{64-N}$ bytes of addressable space. While this embodiment is described in relation to a 64-bit computer system, the invention is not limited to a 64-bit computer system.

Different embodiments can break the virtual address spaces down into pages in any number of different ways. As an example, in one embodiment of the invention each virtual address space can contain one or more pages, different virtual address spaces can contain different size pages, and the same virtual address space may contain different size pages. In an alternative embodiment, all pages within a given virtual address space are of the same size.

Figure 5:
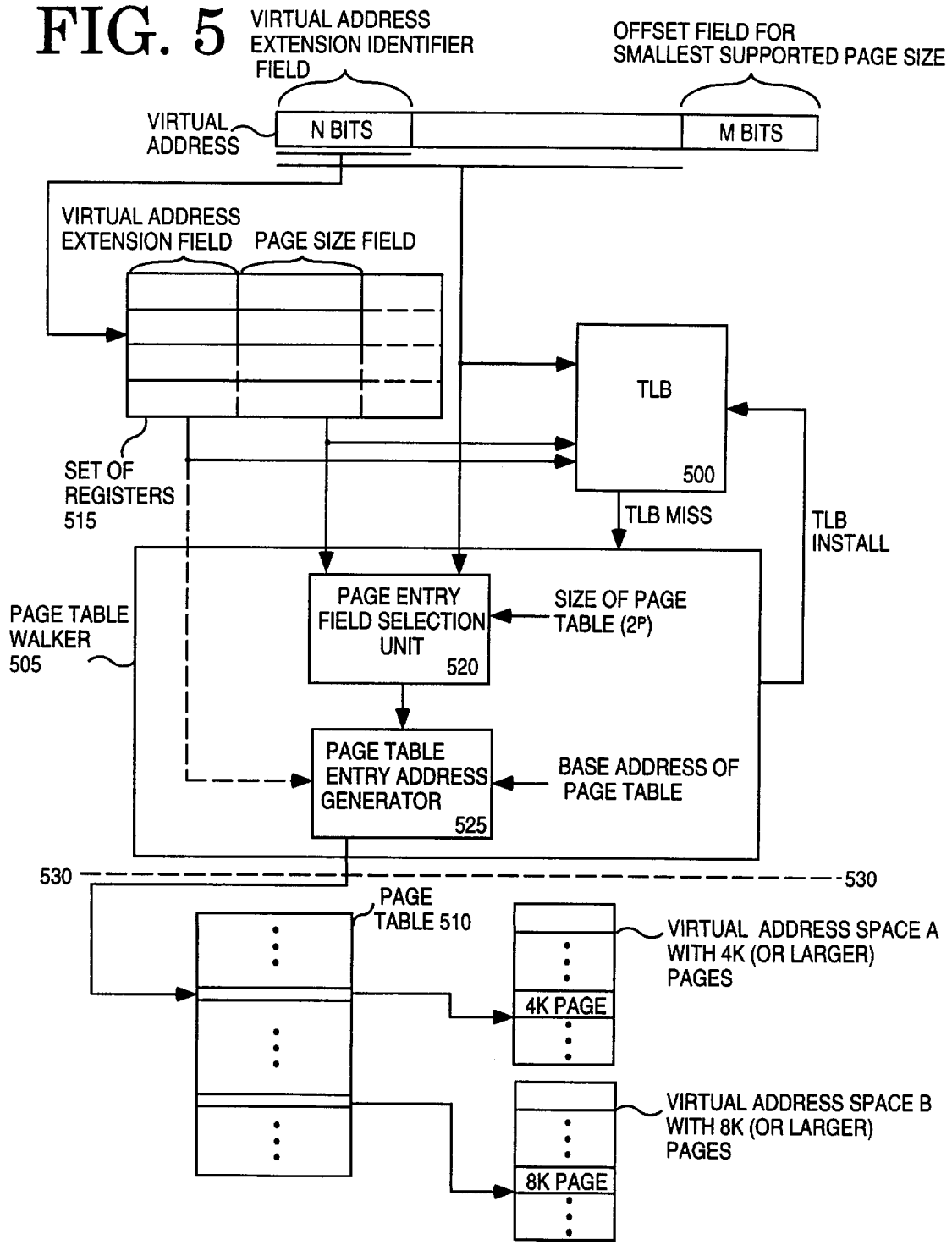
FIG. 5 is a block diagram illustrating a computer system according to one embodiment of the invention.

FIG. 5 is a block diagram illustrating a computer system according to one embodiment of the invention. FIG. 5 shows a translation look-aside buffer (TLB) 500, a page table walker 505, a page table 510, and a set of registers 515. The page table walker 505 includes a page entry field selection unit 520 and a page table entry address generator 525. A dashed line 530 indicates an exemplary division of the computer system between hardware contained in a processor (above the line) and software stored in a machine readable media coupled to the processor (below the line). The various alternative embodiments described with reference to FIGS. 3A and B are equally applicable to the computer system shown in FIG. 5.

FIG. 5 shows a virtual address requiring translation into a physical address. In this embodiment, multiple page sizes are simultaneous supported (e.g., 4K, 16K, 4M, etc.). The number of bits in the offset field of a particular virtual address depends upon the size of the page to which the virtual address is currently mapped. The offset field for the smallest page size supported is illustrated as containing M bits of a virtual address. Each virtual address includes a virtual address extension identifier field containing N bits. The N bits in the virtual address extension identifier field are used to identify a register in the set of registers 515.

The set of registers 515 includes $2^N$ registers, each including a virtual address extension field and a page size field. The virtual address extension fields of the registers 515 are used for storing the virtual address extension for each virtual address space associated with the process currently being executed. Similarly, the page size fields of the registers 515 are used for storing the page sizes to be used in translating the virtual addresses belonging to each virtual address space associated with the process currently being executed. The set of registers 515 therefore represent one mechanism for providing a page size storage area In this embodiment, the set of registers 515 do not necessarily store the same virtual address extensions and pages sizes for every process being currently being multitasked by a processor. In contrast, the virtual address extensions and page sizes for the processes currently being multitasked are swapped between main memory and the registers 515 by the operating system.

Of course, alternative embodiment could include more or less registers in the set of register 515. For example, in one alternative embodiment the processor includes less registers in the set of registers 515 than are required by certain processes and the operating system is responsible for swapping virtual address extensions in and out of the registers 515.

Along with the virtual address, the virtual address extension and page size from the identified one of registers 515 are sent to the TLB 500. The TLB 500 can be implemented in any number of ways (e.g., one or more fully associative caches, one or more direct mapped caches, a combination of fully associated cache(s) and direct-mapped cache(s), etc.). If the TLB 500 contains the translation for the virtual address, the physical page number retrieved from the TLB 500 is concatenated with the offset field of the virtual address to generate the appropriate physical address.

However, if the TLB does not contain the translation for the virtual address, a TLB miss signal is transmitted to the page table walker 505. In response to the TLB miss signal, the page entry field selection unit 520 receives the page size to be used in translating the virtual address from the identified one of registers 515. Like the page entry field selection unit 320, the page entry field selection unit 520 selects a page entry field for the virtual address based on the received page size and the size of the page table.

Like the page table entry address generator 325, the page table entry address generator 525 determines the address of an entry in the page table 510 using the bits in the selected page entry field. In one embodiment, the page table entry address generator 525 can operate in two different modes. In the first mode, the page table entry address generator 525 concatenates the base address for the page table 510 and the bits in the selected page entry field. In the second mode, the page table entry address generator 525 concatenates the base address for the page table 510 with the result of performing an exclusive OR operation on the virtual address extension for the virtual address and the bits in the selected page entry field.

As stated above, the embodiment illustrated in FIG. 5 supports multiple separate virtual address spaces. Two such exemplary virtual address spaces are shown in FIG. 5 as virtual address spaces A and B. While FIG. 5 illustrates each of virtual address spaces A and B as a set of contiguous pages, the actual pages making up the virtual address spaces A and B need not, and often are not, contiguous. The smallest page size supported in the virtual address spaces A and B are respectively 4K and 8K. In the embodiment shown in FIG. 5, the data stored in the page size field of the registers 515 for the virtual address spaces A and B would respectively indicate 4K and 8K page sizes. FIG. 5 also illustrates that a page of the selected page size for a given virtual address space requires a single entry in the page table.

In one embodiment, each virtual address space can support any page size larger than the selected page size for that virtual address space. In this embodiment, the selected page size for a virtual address space is a "default" page size because that page size identifies the page entry field for translating all virtual addresses mapped to that virtual address space, regardless of the actual size of the page to which a particular virtual address is mapped. Alternative embodiments can simply support a single page size per virtual address space. If all or most of the pages in a virtual address space share the same page size, then the footprint of the page table(s) can be reduced. For example, if all of the pages in a virtual address space share the same page size, the common page size need not be stored in each entry of the page table(s) because the common page size is stored in the corresponding one of registers 515.

While one embodiment is described in which bits of the virtual address are used to identify the virtual address extensions, any number of techniques can be used for providing separate virtual address spaces. For example, in one alternative embodiment the separate virtual address spaces are selected based on the instruction being executed, rather than through the use of bits in the virtual addresses. In yet another alternative embodiment, a separate virtual address space is provided for each program by allocating a single virtual address extension to each program. Upon each context switch, the operating system stores the virtual address extension for the program to next be executed in a virtual address extension register on the processor. Each address translation is performed using the contents of the virtual address extension register. In this manner, bits the virtual address are not required to determine the virtual address extension.

In one embodiment, each register 515 stores a hint rather than a virtual address extension. The hint is used by the paging mechanism to achieve better distribution in the page tables and/or to identify different areas in a virtual address space that support different page sizes. Embodiments of the invention that use the hint may or may not support separate virtual address spaces.

Figure 6:
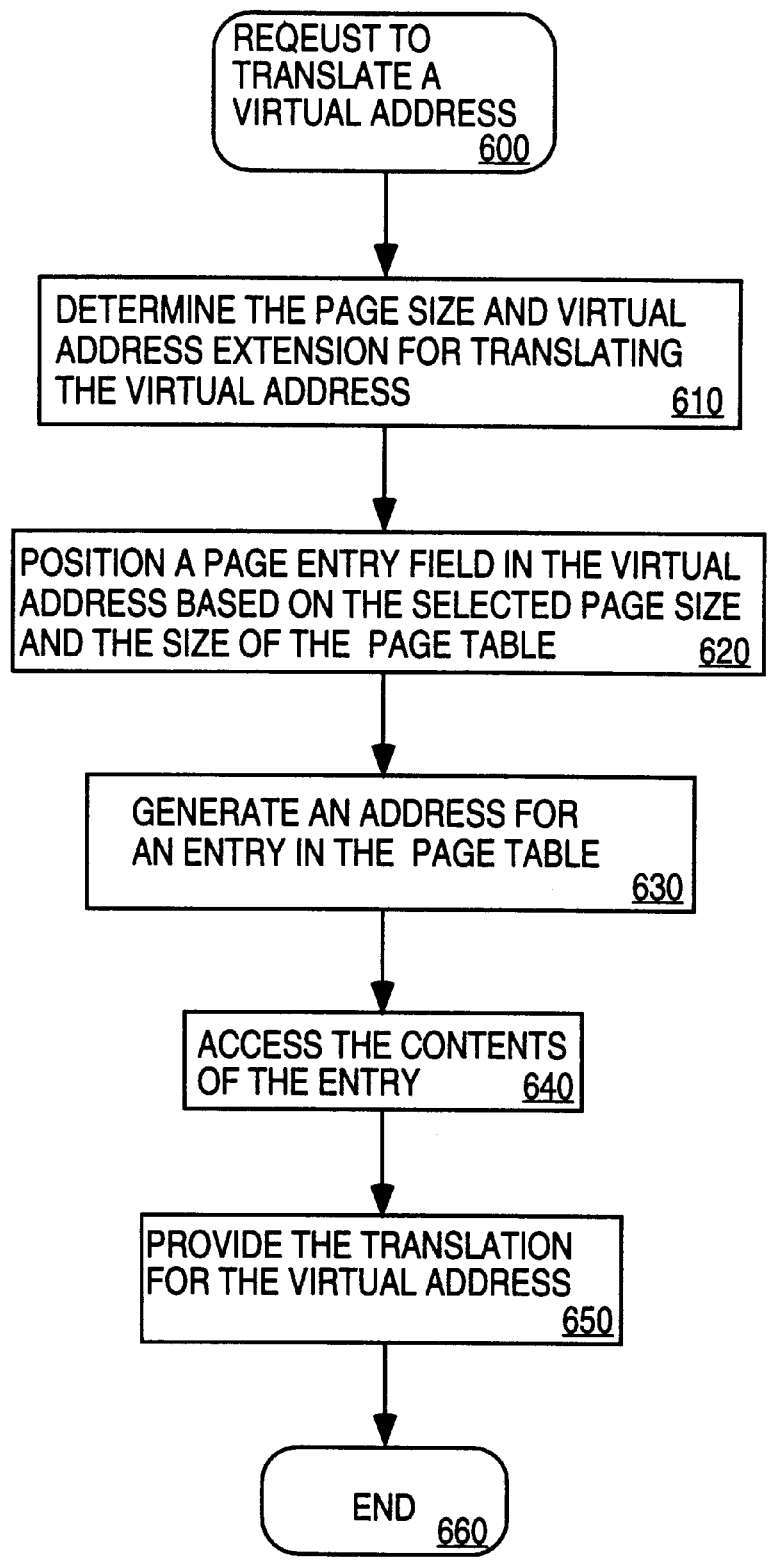
FIG. 6 is a flow diagram illustrating the steps performed by a page table walker according to one embodiment of the invention.

FIG. 6 is a flow diagram illustrating the steps performed by a page table walker according to one embodiment of the invention. The flow diagram starts at step 600, from which control passes to step 610.

As shown in step 610, the page size and virtual address extension to be used in translating the virtual address are determined and control passes to step 620. While the flow diagram is described with reference to an embodiment that uses virtual address extensions, alternative embodiment need not utilize virtual address extensions.

In step 620, a page entry field is positioned in the virtual address based on the selected page size and the size of the page table. From step 620, control passes to step 630.

As shown in step 630, an address for an entry in the page table is generated using the bits of the virtual address in the page entry field. From step 630, control passes to step 640.

In step 640, the contents of the entry in the page table are accessed and control passes to step 650.

As shown in step 650, the translation for the virtual address is determined. The steps performed in step 650 depend on the implementation of the computer system. In a system that supports default page sizes, the following occurs: 1) a check is performed to determine if the selected default page size matches the actual page size; and 2) the offset field is adjusted accordingly. However, in a system that supports a single page size per virtual address space, no such check need be performed and the offset field is based on the page size provided by the page size storage area.

Furthermore, if the page table of the system is not large enough to contain all possible translations, then the data accessed from the entry in the page table is compared to the virtual address to determine if that data represents the correct translation (i.e., to determine if there is a collision). If the accessed entry contains the correct translation, then the translation is provided. However, if the data does not represent the correct translation, then different embodiments may provide the translation for the virtual address any number of ways. For example, software and/or hardware may be used to walk a collision chain. As another example, a different hash function could be used. As yet another example, a completely different page table walker could be used to provide the translation (e.g., a forward mapping page table walker implemented in hardware and/or software).

ALTERNATIVE EMBODIMENTS

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus for use in a computer system, said apparatus comprising:
    a page size storage area for storing a plurality of default page sizes each default page size selected for translating a different set of virtual addresses, wherein each different set of virtual addresses is mapped to one or more page sizes that are equal to or larger than the default page size for that set of virtual addresses; and
    a page table walker including,
        a selection unit coupled to said page size storage area to position a field in each virtual address received by selection unit based on the page size selected for translating that virtual address, and
        a page table entry address generator coupled to receive the bits in the field identified for each virtual address.

2. The apparatus of claim 1, wherein:
    for each virtual address received by said page table walker, said page table entry address generator performs a hash function on the bits that fall within the field identified for that virtual address to identify an entry in a page table.

3. The apparatus of claim 1, wherein said page size storage area includes:
    a set of registers each having a page size field, wherein each page size field is for storing the one of said plurality of page sizes to be used by said page table walker when translating said different set of virtual addresses.

4. The apparatus of claim 3, wherein each register in said set of registers is also for storing a corresponding virtual address extension specifying a different virtual address space for each set of virtual addresses.

5. The apparatus of claim 4, wherein said set of registers are coupled to said page table entry address generator to provide the virtual address extension corresponding to the virtual address currently being translated.

6. The apparatus of claim 5, wherein said page table entry address generator performs a hash function on said virtual address extension and the output of said selection unit when identifying a entry in a page table for the virtual address currently being translated.

7. The apparatus of claim 1 further comprising:
    a translation unit, coupled to said page table walker, to store a plurality of translations for translating virtual addresses into physical addresses, wherein said page table walker operates in response to a page miss signal from said translation unit.

8. The apparatus of claim 1 further comprising:
    a register, coupled to said selection unit, for storing a page table size, said selection unit positioning the field in each virtual address based on both the page size selected for translating that virtual address and the page table size.

9. The apparatus of claim 1, wherein said selection unit is implemented in hardware on a processor.

10. A computer system including a processor coupled to a main memory, said computer system comprising:
    a page size storage area for storing a plurality of default page sizes each default page size selected for translating a different set of virtual addresses, wherein each different set of virtual addresses is mapped to one or more page sizes that are equal to or larger than the default page size for that set of virtual addresses; and
    a page table walker including,
        a selection unit coupled to said page size storage area to position a field in each virtual address received by said selection unit based on the page size selected for translating that virtual address, and
        a page table entry address generator coupled to receive the bits in the field identified for each virtual address; and
    a page table stored in said main memory and coupled to said page table walker.

11. The computer system of claim 10, wherein:
    for each virtual address received by said page table walker, said page table entry address generator performs a hash function on the bits that fall within the field identified for that virtual address to identify an entry in a page table.

12. The computer system of claim 10, wherein said page size storage area includes:
    a set of registers each having a page size field, wherein each page size field has stored therein the one of said plurality of page sizes to be used by said selection unit when translating said different set of virtual addresses.

13. The computer system of claim 12, wherein each register in said set of registers also has stored therein a corresponding virtual address extension specifying a different virtual address space for each set of virtual addresses.

14. The computer system of claim 12, wherein said set of registers are coupled to said page table entry address generator to provide said virtual address extension corresponding to the virtual address currently being translated.

15. The computer system of claim 14, wherein said page table entry address generator performs a hash function on said virtual address extension and the output of said selection unit when identifying a entry in a page table for the virtual address currently being translated.

16. The computer system of claim 10 further comprising:
    a translation unit, coupled to said page table walker, having stored therein a plurality of translations for translating virtual addresses into physical addresses, wherein said page table walker operates in response to a page miss signal from said translation unit.

17. The computer system of claim 10 further comprising:
    a register, coupled to said selection unit, having stored therein a page table size, said selection unit positioning the field in each virtual address based on both the page size selected for translating that virtual address and the page table size.

18. The computer system of claim 10, wherein said page table walker is implemented in hardware on said processor.

19. A computer system comprising:
    an operating system stored in a machine readable medium coupled to a processor, said operating system for causing said processor to distinguish between a first and second virtual address space;
    a page table stored in said machine readable medium; and
    a page table walker in said processor including, a selection unit to position a field in each virtual address received in either a first or second position based respectively on which of said first and second virtual address spaces that virtual address belongs, and a page table entry address generator coupled to said selection unit to identify entries in said page table based on the bits in the field identified for each of the virtual addresses.

20. The computer system of claim 19, wherein:

for each of the virtual addresses received, said page table entry address generator performs a hash function on the bits that fall within the field identified for that virtual address to identify an entry in said page table.

21. The computer system of claim 19, wherein the first and second positions are respectively for a smaller and larger page size.

22. The computer system of claim 21, wherein the smaller page size is equal to or smaller than every page size found in the first virtual address space, and the larger page size is equal to or smaller than every page size found in the second virtual address space.

23. The computer system of claim 19 further comprising:

a set of registers in said processor and coupled to said page table walker, wherein said processor executing said operating system stores in said set of registers a different virtual address extension for each of said first and second virtual address spaces, and wherein said processor executing said operating system also stores in said set of registers a page size for each of said first and second virtual address spaces, the page sizes identifying said first and second positions.

24. The computer system of claim 19 further comprising:

a translation unit in said processor and coupled to said page table walker to store a plurality of translations for translating virtual addresses into physical addresses, wherein said page table walker operates in response to a page miss signal from said translation unit.

25. The computer system of claim 19 further comprising:

a register, coupled to said selection unit, for storing a page table size, said selection unit locating the field in each virtual address also based on the page table size.

26. A method for determining virtual address to physical address translations, said method comprising the computer implemented steps of:

identifying a first and second page size for respectively translating a first and second virtual address;

positioning a field in each of said first and second virtual addresses based respectively on said first and second page sizes;

identifying a first and second entry in a page table based respectively on data in the fields positioned for said first and second virtual addresses;

accessing data in said first and second entries in said page table;

determining that said first virtual address is mapped to a page having an actual size that is larger than said first page size; and determining translations for translating said first and second virtual addresses based respectively on the actual size of the page and said second page size.

27. The method of claim 26 further comprising the preliminary step of:

detecting that translations for said first and second virtual addresses are not stored in a translation look-aside buffer.

28. The method of claim 26, wherein said step of identifying said first and second page size includes the step identifying said first and second page size based respectively on bits said first and second virtual addresses.

29. The method of claim 26, wherein said method further includes the steps of:

identifying a first and second virtual address extension based respectively on bits in said first and second virtual addresses; and identifying said first and second entry in said page table also based respectively on said first and second virtual address extensions.

30. The method of claim 26 further comprising the steps of:

storing in a dynamic storage area data indicating a size for the page table; and identifying said first and second entry in said page table also based respectively on said size.

31. A method for determining virtual address to physical address translations, said method comprising the computer implemented steps of:

identifying a first and second page size for respectively translating virtual addresses that belong to a first and second virtual address space;

positioning a field in each of a first and second virtual address based respectively on said first and second page sizes;

identifying a first and second entry in a page table based respectively on data in the fields positioned for said first and second virtual addresses;

accessing said first and second entries in said page table; and determining translations for translating said first and second virtual addresses.

32. The method of claim 31, wherein said method further includes the step of:

associating said first and second page size respectively with said first and second virtual addresses based on bits in said first and second virtual addresses.

33. The method of claim 31, wherein:

said method further includes the step of identifying a first and second virtual address extension respectively for said first and second virtual address space; and said step of identifying said first and second entry further includes the step of identifying said first and second entry also based respectively on said first and second virtual address extensions.

34. The method of claim 31 further includes the steps of:

selecting said first page size to be equal to or smaller than the smallest page size in said first virtual address space; and selecting said second page size to be equal to or smaller than the smallest page size in said second virtual address space.

35. The method of claim 31 further comprising the preliminary step of:

detecting that translations for first and second virtual addresses are not stored in a translation look-aside buffer.

* * * * *